Dec. 17, 1968 P. A. WELLER ET AL 3,416,330
APPARATUS FOR COOLING DYNAMOELECTRIC MACHINES
Filed May 18, 1966
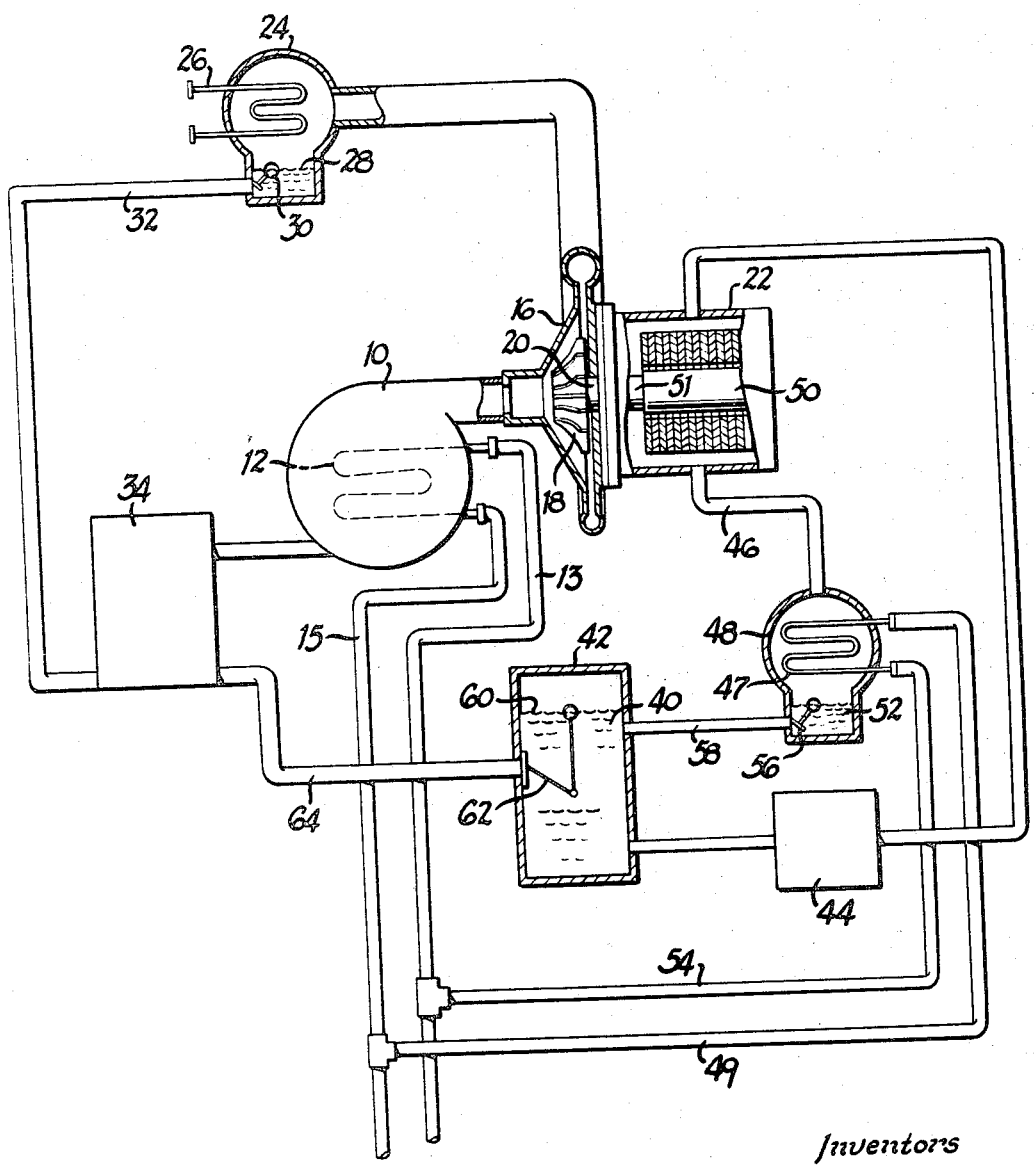
Inventors
Peter A. Weller
Hollis C. Grubb
By WILSON, SETTLE, BATCHELDER
Att'ys. & CRAIG 3,416,330
Patented Dec. 17, 1968

3,416,330
APPARATUS FOR COOLING DYNAMOELECTRIC MACHINES
Peter A. Weller, Farmington, and Hollis C. Grubb, Southfield, Mich., assignors to American Radiator & Standard Sanitary Corporation, New York, N.Y., a corporation of Delaware
Filed May 18, 1966, Ser. No. 551,153
4 Claims. (Cl. 62—505)

ABSTRACT OF THE DISCLOSURE

A main refrigerating system and an isolated refrigerating or cooling system are provided with the isolated system being associated with the main system. The isolated system is utilized for cooling the compressor motor of the main system and the refrigerant of the isolated system is not reintroduced into the main system and yet refrigerant is selectively replenished to the isolated system from an accumulator in the main system. At the same time, the heat from the heated refrigerant is conducted through the medium of the isolated system to the medium to be cooled by the main refrigerating system.

---

This invention relates to cooling dynamoelectric machines, and more particularly to cooling of a dynamoelectric machine through the agency of a main refrigeration system but wherein the particular system for cooling the dynamoelectric machine is effectively isolated from the main system.

Heavy duty dynamoelectric machines, such as electric motors utilized for driving heavy duty refrigerant compressors for industrial air conditioning installations, have conventionally been either air or water cooled. Of necessity, when air-cooled, such dynamoelectric machines have been built to extremely large dimensions to provide adequate radiation surfaces to permit the large body of heat generated thereby to be dissipated. The prior art air-cooled constructions have often resulted in electric motors that are of actually larger physical size than the efficient, rotory centrifugal compressors which they drive. As a result, such large driving motors and the attendant component structures of the cooling system have taken substantial amounts of desirable room from within the building structure where they are located. Further, the weight of these large units has often required supplemental bracings for building support.

The cooling of motors by heat-exchange with water coils is an advance over air-cooling. However, water cooling has required substantial amounts of auxiliary equipment in the form of pumps, cooling towers, and the like, as well as extensive plumbing with flow control valves and associated structures. Also, problems of water treating to prevent corrosion and scale formation, freezing and malformations involving danger of high pressure steam formations have been involved, requiring frequent cleaning and maintenance. Also, water cooling apparatus is large and cumbersome, requiring exterior cooling spray towers and the like.

Recently, efforts have been made to inject liquid refrigerant into the interior of a motor to be operative therein and thereby provide efficient operation with adequate cooling and, at the same time, reducing the physical size of the unit. In such prior art systems, refrigerant has been taken directly from a main refrigeration system and injected into the motor interior and then returned to the main refrigeration system.

One disadvantage in prior art systems is that refrigerant in the main refrigeration system may have contaminants. These contaminants, once introduced into the motor housing, may cause premature wearing of the field windings as a result of either abrasion or corrosion. Another problem involved in utilizing the refrigerant directly from the main system is a control problem. The controls for the main system are basically designed to operate the system efficiently in connection with the load offered by the evaporator. When a motor is also directly cooled by refrigerant from the main system, additional controls must be incorporated in order to take into account the drain of refrigerant to the motor at times of high load. This in effect compounds the control problem.

These problems are solved by the present invention by isolating the cooling system for the dynamoelectric machine from the main refrigeration system. In this manner, separate controls are provided for both the main refrigeration system and the isolated cooling system, thus reducing the control problem. Additionally, the refrigerant in the isolated system for cooling the motor is not materially affected by the contaminants in the main system. Contaminants in the isolated system may thus be effectively maintained at a minimum thus reducing the corrosion and wear problem in the motor.

It is therefore an object of this invention to provide a cooling system for dynamoelectric machines wherein refrigerant fluid is derived from a body of refrigerant fluid used in a main refrigeration system only at such times as the refrigerant supply in the dynamoelectric machine cooling system falls below a predetermined point.

Another object of the invention is to cool dynamoelectric machines by means of a separate cooling system which operates in conjunction with a main refrigeration system in a manner that facilitates control of heat transfer without resorting to complicated and expensive control apparatus.

A further object of the invention is to cool dynamoelectric apparatus through the agency of a main refrigeration system but wherein refrigerant, containing system contaminants, is not continuously fed from the main refrigeration system into the dynamoelectric machine.

Other objects of this invention will appear in the following description and appended claims, reference being had to the accompanying drawings forming a part of this specification wherein like reference characters designate corresponding parts in the several views.

In the drawing:

The figure is a diagrammatic view of a system for cooling dynamoelectric machines in accordance with one embodiment of the present invention.

Before explaining the present invention in detail, it is to be understood that the invention is not limited in its application to the details of construction and arrangement and parts illustrated in the accompanying drawings, since the invention is capable of other embodiments and of being practiced or carried out in various ways. Also, it is to be understood that the phraseology or terminology employed herein is for the purpose of description and not of limitation.

Referring to the figure, there is shown an overall plan view in diagrammatic form of one embodiment of this invention. The usual components of a refrigeration system are illustrated. These comprise an evaporator 10, in which is provided a coil 12. Water or other fluid to be cooled is passed into the coil 12 via conduit 13 and cooled fluid is exhausted therefrom via conduit 15. The refrigerant fluid after thermal contact with coil 12 undergoes a change of state from liquid to gas.

The gaseous refrigerant, carrying the heat transferred to it by the medium to be cooled, is fed into a compressor 16 which impels the gas by vanes 18 mounted on shaft 20 into a more highly pressurized state. The shaft 20 of the compressor 16 is driven by a motor 22.

The compressed gaseous refrigerant is exhausted from the compressor to a condenser 24 where the heat of the gaseous refrigerant under pressure is transferred to a condenser coil 26 which conducts this heat away from the system. This medium passing through coil 26 is normally water. The result of this heat exchange is that the refrigerant is condensed back to liquid form in a body 28 in the condenser. This body of refrigerant 28 is selectively fed from the condenser by means of a float valve 30 through a conduit 32 to an accumulator 34.

It is from this accumulator 34 that liquid refrigerant is injected into the evaporator 10 by means of the differences of pressure upon the body of liquid 28 and the gaseous refrigerant leaving the evaporator and entering the compressor.

So far what has been described is simply the usual refrigeration system. What will now be described is the means by which this usual refrigeration system is combined with other elements to form an isolated cooling system for the motor 22.

In an auxiliary system that is isolated from the main system just described, a body of refrigerant 40 is contained within an accumulator 42. A pump 44 draws the liquid refrigerant from the accumulator 42 and feeds it into the motor 22. Here the refrigerant fluid is at least in part rendered into a gaseous state or rendered into mist-like droplets due to the heat of the motor and the motion applied to the refrigerant by the rotor of the motor. Heat is thus transferred from the motor to the refrigerant. This heated refrigerant is then conducted away from the motor by conduit 46 to a condenser 48.

A coil 47 is provided in the condenser 48. A portion of the fluid which has been cooled by the evaporator 10 is tapped from conduit 15 by a conduit 49 and fed into the coil 47. Heat of the refrigerant in condenser 48 is thus absorbed by coil 47. This heat transfer condenses the gaseous portion of the refrigerant back to a liquid form and collects in a body 52 in the condenser 48. The heated fluid in coil 47 is returned by conduit 54 to the conduit 13 that carries the heated medium 12 to the evaporator.

The condensed refrigerant liquid 52 is selectively returned to the accumulator 40 responsive to the level of the body of liquid 52 sensed by a float valve 56 operable to conduct refrigerant fluid through conduit 58 to the accumulator 42.

A small amount of refrigerant is continuously lost from the motor cooling system. This loss generally results from gaseous refrigerant passing through the shaft seals of the shaft 51 of the rotor 50. When this loss is such that the level 60 drops to a predetermined threshold, float valve 62 in the accumulator 42 is operable to open so as to allow an amount of refrigerant to be conducted through conduit 64 from the accumulator 34 to the accumulator 42.

In this manner, the refrigerant used to cool the motor is always effectively isolated from the refrigerant used in the evaporator 10 and compressor 16, in terms of being fed back into the accumulator 34 feeding the evaporator 10 and compressor 16 and losses of refrigerant for cooling the motor 22 can be selectively replaced by drawing from the reservoir of refrigerant collected in the accumulator 34.

From the above description, it can be seen that a refrigeration system has been provided which includes means for cooling the motor used to drive the compressor of the refrigeration system such that the refrigerant so used is never reintroduced into the main refrigeration system and yet is selectively replenished from an accumulator in the main refrigeration system. At the same time, the heat from the motor is conducted through the medium of the isolated refrigerant to the medium to be cooled by the main refrigeration system.

Thus the motor can be cooled without requiring an additional evaporator and compressor yet utilizing the heat transfer of the main refrigeration system to provide such cooling while being prevented from continuously receiving contaminants from the refrigerant used in the main refrigeration system. It can be seen from the above description that this is accomplished in an economical manner. It functions without requiring costly control apparatus to maintain a continuous steady state of dynamic heat transfer.

It will be appreciated that the present system may also be used in connection with dynamoelectric machines other than compressor motors. For example, a bank of generators in a power station could be effectively cooled by a main refrigeration system which also might be used to cool the building housing the generators.

We claim:

1. Means for cooling a dynamoelectric machine including a main refrigeration system having an accumulator of refrigerant liquid, a medium to be cooled by evaporating refrigerant liquid in evaporation means, a compressor of refrigerant fluid, means conducting heat away from the compressed refrigerant fluid sufficient to condense the fluid back to a liquid state under a higher pressure than the liquid introduced into the aforementioned evaporation means, and a conduit of liquid from the condenser to the accumulator, the improvements of: means isolating a body of refrigerant liquid from the aforementioned main system in an isolated accumulator; means pumping said isolated refrigerant from the isolated accumulator into the dynamoelectric machine in a manner so as to transfer the heat from the dynamoelectric machine to the refrigerant pumped thereinto; means withdrawing the heated refrigerant from the dynamoelectric machine; means cooling the heated refrigerant back to a body of liquid; and means returning the body of liquid refrigerant back to the isolated accumulator.

2. The apparatus of claim 1 and means conducting the heat from the heated refrigerant to the medium cooled by the refrigeration system.

3. The apparatus of claim 2 and means for selectively adding to the fluid in direct thermal contact with the dynamoelectric machine.

4. The apparatus of claim 3 wherein said selectively fluid adding means is responsive to a predetermined amount of said fluid in the isolated accumulator.

References Cited

UNITED STATES PATENTS

| Re. 24,802 | 3/1960 | Kocher et al. | 62—505 |
|---|---|---|---|
| 2,249,882 | 7/1941 | Buchanan | 62—505 |

ROBERT A. O'LEARY, *Primary Examiner.*